L. B. HUNING.
ADJUSTABLE COFFEE PERCOLATOR.
APPLICATION FILED JUNE 1, 1918.
1,309,414. Patented July 8, 1919.
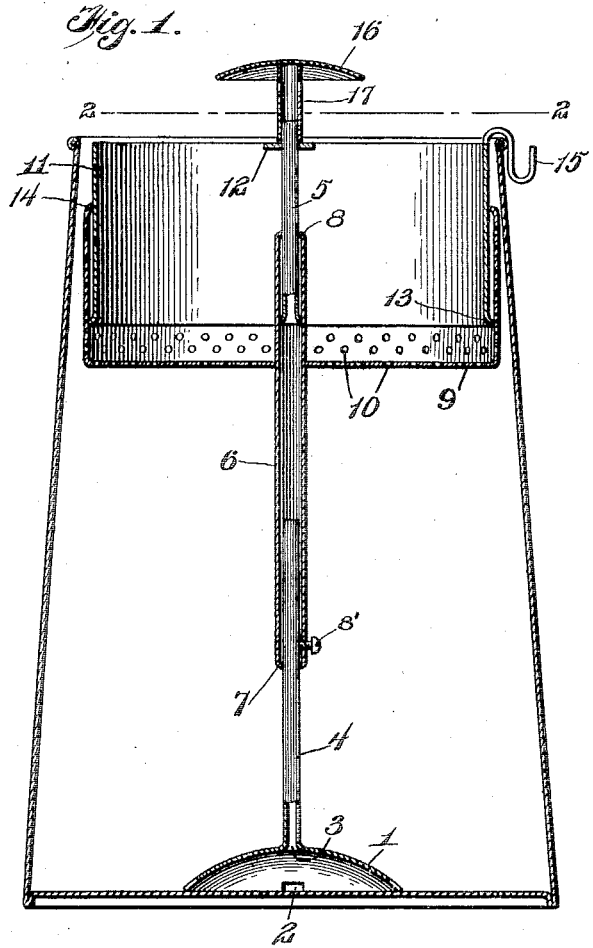
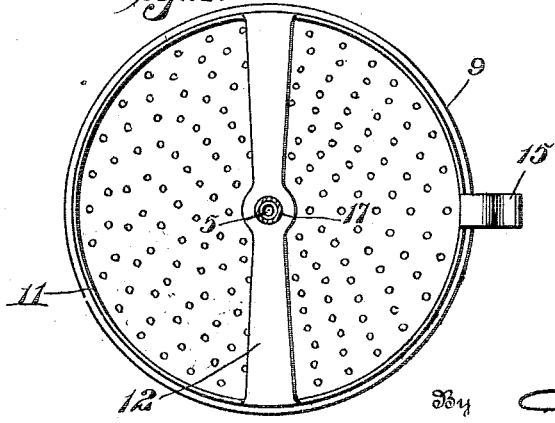
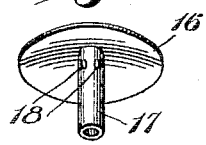
Inventor
L. B. Huning
By C. C. Hines,
Attorney

UNITED STATES PATENT OFFICE.

LOUIS B. HUNING, OF PHILADELPHIA, PENNSYLVANIA.

ADJUSTABLE COFFEE-PERCOLATOR.

1,309,414.     Specification of Letters Patent.     Patented July 8, 1919.

Application filed June 1, 1918. Serial No. 237,685.

*To all whom it may concern:*

Be it known that I, LOUIS B. HUNING, a citizen of the United States, residing at Philadelphia, in the county of Philadelphia, and State of Pennsylvania, have invented new and useful Improvements in Adjustable Coffee-Percolators, of which the following is a specification.

This invention relates to coffee percolators and the object in view is to produce what may be termed an adjustable percolator or one which is capable of being adjusted in two ways, first to adapt the same to the ordinary old style coffee pots of any size; secondly, to adjust the size or capacity of the coffee containing receptacle. By reason of the adjustment of the different parts of the percolator, as herein shown and described, said percolator is adapted to be changed to suit large and small families, for example.

With the above and other objects in view, the invention consists in the construction, combination and arrangement of parts, as herein described, illustrated and claimed.

In the accompanying drawings:

Figure 1 is a vertical diametrical section through the percolator showing the same in its applied relation to a coffee pot.

Fig. 2 is a cross section on the line 2—2 of Fig. 1.

Fig. 3 is a detail view of the spreader cap or member.

The adjustable percolator contemplated in this invention, comprises a combined supporting base and vapor or steam collecting member 1 which is of an inverted dish shape, as shown and formed in the lower marginal edge thereof with notches 2 for the passage of hot water, steam or vapor.

Extending upwardly from an opening 3 in the top and center of the base 1 is a longitudinally extensible tube comprising a lower section 4, an upper section 5 and an intermediate section 6, said tube sections 4, 5 and 6 having a slidable telescopic connection and engagement with each other whereby the tube, as a whole, may be extended or contracted in length. The lower section 4 is fixedly connected with the base 1. The intermediate section 6 is slidingly and frictionally engaged with said lower section 4, the bottom edge of the section 6 being inwardly swaged to form a friction lip 7 which bears snugly against the tube section 4 but is adapted to be slipped longitudinally thereon by the application of the requisite force. In like manner, the upper extremity of the intermediate tube section 6 is swaged inwardly to form a friction rib 8 which bears against the upper tube section 5 but is slidable thereon when sufficient force is exerted for that purpose. A set screw 8' is provided to adjustably secure the section 6 to the section 4.

The coffee containing receptacle comprises a lower member 9 which is fixedly secured centrally thereof to the intermediate tube section 6. Said lower receptacle section 9 is of reticulated formation, being shown as formed with perforations 10 in the bottom and side walls thereof. The receptacle also comprises an upper section 11 which is mounted fixedly at a central point on the upper tube section 5, the receptacle section 11 being for that purpose provided with a diametrically extending cross piece 12 through the center of which the tube section 5 is inserted and to which it is secured. This leaves the top of the coffee receptacle otherwise freely open to receive the downwardly moving steam or hot water. The sections 9 and 11 of the coffee receptacle are preferably of cylindrical formation and fit telescopically one within the other. As shown the bottom edge of the upper section 11 is swaged outwardly to form an annular friction lip 13 which engages the inside wall of the lower section 9, and, correspondingly, the top edge of the bottom section 9 of said receptacle is inwardly swaged as shown at 14 to form an annular friction lip which engages the outer surface of the upper section 11 of said coffee receptacle. This provides for adjusting the sections 9 and 11 in relation to each other to vary the containing capacity of the receptacle as a whole. The upper section 11 of the coffee receptacle is formed with one or more spring hooks or clasps 15 of hook like formation adapted to be engaged over the top edge or rim of a coffee pot in order to sustain the upper section of the coffee receptacle in fixed relation to said pot.

Upon the upper extremity of the top section 5 of the central tube, I place a spreader and deflector 16 of inverted dish shape. Said spreader has extending downwardly from the center thereof a tubular stem or neck 17 which has a telescopic and sliding connection with the intermediate tube section 6 and which frictionally engages the latter so that it may be maintained at any desired adjustment according to the height at which the body of the spreader 16 is to be arranged. The tubular neck 17 is formed with outlet ports 18 for the steam, vapor and hot water rising through the central telescopic tube hereinabove described.

From the foregoing description taken in connection with the accompanying drawings, it will now be understood that the capacity of the coffee receptacle may be changed by adjusting the upper and lower sections of said receptacle in relation to each other, this being permitted by reason of the telescopic and sliding connection between the adjacent sections of the central tube. Additionally, the percolator, as a whole, may be adjusted to a coffee pot of any height, by reason of the telescopic and sliding connection between the sections 4 and 6 of said central tube. By means of the two adjustments, the percolator may be adjusted to fit different sizes of coffee pots, thereby adapting the percolator, for example, to large and small families.

I claim:—

1. An adjustable coffee percolator, embodying, in combination, a hollow supporting and vapor gathering base, a longitudinally extensible tube rising from said base and comprising three telescopic sections the lower one of which is attached to said base, a coffee grounds receptacle consisting of a lower reticulated section fast upon the next higher section of said tube and adjustable up and down therewith, and an upper section fast on the upper section of said tube and adjustable up and down therewith to vary the capacity of the receptacle as a whole, and means for supporting said upper section of the receptacle on the rim of a coffee pot.

2. An adjustable coffee percolator, embodying in combination, a hollow supporting and vapor gathering base, a longitudinally extensible tube rising from said base and comprising three telescopic sections the lower one of which is attached to said base, a coffee grounds receptacle consisting of a lower reticulated section fast upon the next higher section of said tube and adjustable up and down therewith, an upper section fast on the upper section of said tube and adjustable up and down therewith to vary the capacity of the receptacle as a whole, means for supporting said upper section of the receptacle on the rim of a coffee pot, and an inverted dish-shaped spraying member having a pendent tubular stem telescopically fitting and adjustable up and down in relation to the upper section of said tube.

3. An adjustable coffee percolator, embodying, in combination, a hollow supporting and vapor gathering base, a longitudinally extensible tube rising from said base and comprising three telescopic sections the lower one of which is attached to said base, a coffee grounds receptacle consisting of a lower reticulated section fast upon the next higher section of said tube and adjustable up and down therewith, an upper section fast on the upper section of said tube and adjustable up and down therewith to vary the capacity of the receptacle as a whole, means for supporting said upper section of the receptacle on the rim of a coffee pot, the upper and lower sections of said receptacle being cylindrical and having a frictional telescopic relation to each other.

In testimony whereof I affix my signature.

LOUIS B. HUNING.

Copies of this patent may be obtained for five cents each, by addressing the "Commissioner of Patents, Washington, D. C."